United States Patent [19]

Mukherjee

[11] Patent Number: 4,992,519

[45] Date of Patent: Feb. 12, 1991

[54] BINDER COMPOSITION WITH LOW FORMALDEHYDE EMISSION AND PROCESS FOR ITS PREPARATION

[75] Inventor: Subhankar Mukherjee, San Paulo, Brazil

[73] Assignee: Borden, Inc., Columbus, Ohio

[21] Appl. No.: 304,967

[22] Filed: Feb. 1, 1989

[51] Int. Cl.$^5$ .................. B32B 5/00; B27N 3/00; C08J 5/00; C08L 3/00

[52] U.S. Cl. .................. 527/300; 156/62.2; 156/327; 156/336; 428/326; 428/533; 524/13; 524/27; 524/47; 524/56; 524/734

[58] Field of Search .............. 524/13, 47, 734, 56, 524/27; 156/62.2, 327, 336; 428/326, 533; 527/300

[56] References Cited

U.S. PATENT DOCUMENTS

| | | | |
|---|---|---|---|
| 1,949,831 | 3/1934 | Ford | 527/309 |
| 2,051,025 | 8/1936 | Bauer | 156/208 |
| 2,102,937 | 12/1937 | Bauer | 156/210 |
| 3,778,392 | 12/1973 | Hughes | 527/305 |
| 3,983,084 | 9/1976 | Alexander et al. | 524/47 |
| 3,984,275 | 10/1976 | Hofmann et al. | 524/47 |
| 4,107,379 | 8/1978 | Stofko | 156/62.2 |
| 4,247,433 | 1/1981 | Schamberg | 524/843 |
| 4,357,194 | 11/1982 | Stofko | 156/308.6 |
| 4,409,293 | 10/1983 | Williams | 524/27 |
| 4,482,699 | 11/1984 | Williams | 528/260 |
| 4,654,259 | 3/1987 | Stofko | 524/56 |

*Primary Examiner*—John Kight, III
*Assistant Examiner*—P. H. Hightower
*Attorney, Agent, or Firm*—Rockey and Rifkin

[57] ABSTRACT

Binder for the production of particle board and plywood with low formaldehyde emission which comprises a polymer formed fron an acidified starch hydrolyzate, urea and formaldehyde. Process for preparation of the polymer and for its use for production of particle board and plywood are also disclosed.

12 Claims, No Drawings

BINDER COMPOSITION WITH LOW FORMALDEHYDE EMISSION AND PROCESS FOR ITS PREPARATION

FIELD OF THE INVENTION

This invention relates to modified urea-formaldehyde (UF) binders for use in the production of particle board and plywood and to a process for preparation of the binders. These binders are characterized by their low formaldehyde emission. The invention also refers to a process for cross-linking the binder and to a composition comprising said binder.

BACKGROUND OF THE INVENTION

The latent emission potential of formaldehyde from urea-formaldehyde resin bonded lignocellulosic material, such as particle board and plywood, has greatly restricted the use of such composite materials in applications in indoor environments. The restriction is due to the fact that formaldehyde is considered a carcinogenic agent and is an irritant when present even in parts per million in a closed environment.

The reason for the slow liberation of formaldehyde from binder/lignocellulosic systems has been the object of extensive research for many years. It is well known that UF resins with a high mole ratio of formaldehyde to urea have specific chemical bonds between the cellulosic material and methylol or formaldehyde ureas that undergo chemical degradation due to atmospheric moisture, changes in pH, temperature and other factors which play an important role in the formaldehyde emissions.

In order to overcome the above-mentioned problems, various methods have been used in recent years. One method is to reduce the formaldehyde:urea ratio in the resin. A second method is to use formaldehyde scavengers during application of the resin. A third method refers to the use of latent reactants. Furthermore, the use of less volatile aldehydes in place of formaldehyde helps to solve emission problems. However, almost all viable substitutes for formaldehyde in lignocellulosic composite materials are too expensive.

Another problem appears when the formaldehyde:urea mole ratios are lowered. The internal bond strength of the material decreases. This requires the use of a greater amount of resin which renders the process unattractive.

The use of formaldehyde scavengers results in a low formaldehyde emission during applications but does not prevent the slow and continuous liberation of formaldehyde subsequent to the application.

Thermodynamic considerations on the methylolation of urea, which is the initial reaction between urea and formaldehyde, lead to the conclusion that the third and fourth (theoretical) positions of the methylol groups in the four possible methylol urea positions are weakly attached and hence are potentially more labile, i.e., subject to relatively easy degradation. It is well recognized that the methylol ureas are responsible for the gluing characteristics of the resin to a cellulosic material and are involved in chemical reactions with the substrates. Thus, if a part of these labile linkages can be substituted by less volatile aldehydes compared to formaldehyde, the liberation of formaldehyde due to chemical degradation decreases.

The present invention is based on the above considerations and refers to a binder system with improved adhesion properties and low formaldehyde liberation in order to meet the DIN E-1 specifications, that emission of formaldehyde by the perforator test must be less than 10 mg/100 g.

The present invention discloses a process for the production of a binder with low emission of formaldehyde, a composition comprising said binder which is used in the production of particle board and plywood and a process for crosslinking said composition when added to these lignocellulosic materials.

In the process of this invention part of the formaldehyde in the urea-formaldehyde binder is replaced by a higher aldehyde which is generated in situ from commonly available carbohydrates such as starch, dextrose, saccharose, etc. The use of starch, dextrose, and saccharose in urea-formaldehyde polymer systems has been reported previously. These carbohydrates have been used to reduce polymer costs, to increase plasticity of the cured polymer, or to increase viscosity or tackiness of the polymer, etc. However, such uses have not comprised preparation of aldehydes from carbohydrate systems in order to copolymerize them with the urea-formaldehyde resin and produce a polymer system wherein the post-emission of formaldehyde is greatly reduced.

The present invention is specifically directed to lignocellulosic/polymer composites, wherein the polymer is the binding agent, and intends to solve the problems of the state of art, by reducing formaldehyde emission while maintaining the adhesion characteristics of the polymer.

SUMMARY OF THE INVENTION

This invention provides a binder for use in production of particle board and plywood with low formaldehyde emission which consists essentially of a polymer formed by the reaction of an acidified starch hydrolyzate, urea and formaldehyde, wherein the starch hydrolyzate comprises from about 3% to about 40% by weight of the polymer on a dry solids basis and wherein the molar ratio of urea to formaldehyde in the polymer is from about 1:1 to about 1:1.5.

Also provided in accordance with this invention are processes for preparing the binder of this invention and processes for bonding lignocellulosic material using the binder of this invention.

DETAILED DESCRIPTION OF THE INVENTION

The carbohydrates used in the practice of this invention may be any of the mono- or disaccharides or starch hydrolyzates. In a preferred practice of this invention starch hydrolyzates are prepared from a starch and used in situ without isolation. The starch used for the preparation of the hydrolyzate may be derived from any of the common sources such as wheat flour, maize flour, corn, potato, tapioca, manioc, etc.

The starch can be directly hydrolyzed or pre-acetylated and subsequently subjected to enzymatic hydrolysis. In another embodiment of the invention the carbohydrate can be selectively oxidized prior to the enzymatic hydrolysis using a mixture of hydrogen peroxide and ferrous sulfate or nitrous acid.

Hydrolysis of the acetylated or non-acetylated starch is carried out in an aqueous suspension using two different types of enzymes. The solids to water ratio ranges from 20:80 to 60:40 under a pH maintained in the range from about 4 to about 8. Hydrolysis may be carried out in two stages. The starch is first hydrolyzed with alpha-amylase enzyme at a temperature of from 30° C. to 60° C. Amyloglucosidase enzyme is subsequently added to the system with stirring at 60° C. to 90° C. until complete saccharification of the starch is achieved and the starch-iodide test is negative. The solution may be distillation concentrated under reduced pressure to a solids content of from 50% to 85%.

Alternatively, the starch may be hydrolyzed by adding both the alpha-amylase and amyloglucosidase at the same time. In this case the temperature is raised slowly from room temperature to from about 80° C. to about 90° C. while the mixture is stirred. Hydrolysis is continued until all of the starch is solubilized and the starch-iodide test is negative.

It is an important characteristic of the present invention, in comparison with enzymatic hydrolyses of the state of art which take from 8 to 9 hours to complete, that the total degradation of the carbohydrate occurs within two hours in the process of the invention.

The binder of this invention is prepared by reacting an acidified aqueous starch hydrolyzate solution with urea and formaldehyde to form a copolymer. The aqueous starch hydrolyzate solution may contain from about 40% to about 80%, preferably from about 45% to about 55%, by weight of water. In the practice of this invention, the starch hydrolyzate solution is acidified to a pH of from about 0.5 to about 5 before the reaction with urea and formaldehyde is carried out.

The copolymer, which is the binder of this invention, comprises from about 3% to about 40% by weight of starch hydrolyzate. The remainder of the copolymer is derived from urea and formaldehyde in which the molar ratio of urea to formaldehyde is from about 1:1 to about 1:1.5.

To prepare the binder of this invention, the formaldehyde may be added first to the acidified starch hydrolyzate. Then a portion of the urea is reacted with the mixture at an acidic pH. Reaction with the balance of the urea is carried out at a neutral to slightly alkaline pH. Alternatively, a portion of the urea may be reacted first with the acidified starch hydrolyzate before the formaldehyde and the balance of the urea are introduced into the reaction mixture, and the formation of the copolymer is completed at a neutral to alkaline pH. Reaction is carried out until the free formaldehyde is less than 1%, preferably less than 0.2 to 0.6%.

In a preferred method for making the binder for use in the production of particle board, the formaldehyde is first added to the starch hydrolyzate, preferably at a pH of from about 0.5 to about 3.0. The weight ratio of starch hydrolyzate to formaldehyde is preferably from about 1:1 to about 1:10. It is convenient to use an aqueous solution of 37%–44% formaldehyde for this purpose. However, other well-known forms of formaldehyde may be employed. Urea is next added slowly to the solution of starch hydrolyzate and formaldehyde while maintaining the temperature of the exothermic reaction below about 95° C. After sufficient urea has been added to reach a urea to formaldehyde molar ratio of from about 1:4 to about 1:2.5, the pH of the mixture is adjusted to from about 6.0 to about 8.5. Then more urea is added slowly while maintaining the temperature in the range of from about 50° C. to about 70° C. and addition is continued until the molar ratio of urea to formaldehyde is from about 1:1 to about 1:1.5.

In a preferred method for making the binder for use in the production of plywood, an aqueous solution of starch hydrolyzate containing from about 40% to about 80% by weight of water and from about 2% to about 5% of the total amount of urea is refluxed at a pH of from about 3 to about 5 for from about 20 to about 60 minutes. Then from about 50% to about 60% by weight of the total amount of formaldehyde to be used is added. The pH is adjusted to from about 6.0 to about 8.5, an additional 20% to about 40% of the urea is added and the mixture is again refluxed. Then the pH of the mixture is adjusted to from between about 4.0 and about 5.5 and heating is continued until the Gardner viscosity of the solution is E to F. Finally the pH is adjusted to from about 6.0 to about 8.5 and the additional portions of formaldehyde and urea are added while maintaining the temperature of the mixture at from about 60° C. to about 80° C. for an additional 30 to 90 minutes.

While we do not want to be bound by theory, we believe that the low formaldehyde emission of these polymers is due to their incorporation of an aldehyde derived from the starch hydrolyzate. It is believed that hydroxymethylfurfural is generated from the hydrolyzate under acidic conditions. This then condenses with urea to give furfurylol ureas. Infra-red analysis indicated that such derivatives are present in the reaction mixture and that they are incorporated into the copolymer.

The binders of this invention are useful for preparing particle board and plywood by bonding lignocellulosic material under heat and pressure. The binder and from about 1% to about 20% by weight of the binder of a curing agent is applied to the cellulosic material and then the mixture is consolidated under heat and pressure.

A composition is used in the production of particle board comprising lignocellulosic material, binder and a curing agent or crosslinking agent. In the above cited composition the binder is present in 5% to 15% by weight, based on the dry weight of the lignocellulosic material and the curing or crosslinking agent is present in about 1% to about 20% by weight, based on the weight of the binder.

A composition is used in the production of plywood comprising lignocellulosic material, binder and curing or crosslinking agent, wherein the binder is present in about 200 to 400 grams of binder per square meter of contact surface area and the curing agent is present in about 1% to about 20% by weight, based on the weight of the binder.

The crosslinking or curing agent can be any acidic agent or potentially acid releasing agent or any Lewis acid. Preferably the curing agent is a mixture of 1:1 to 1:0.1 and preferably 1:0.2 to 1:0.5 of ammonium chloride to urea or equivalent quantities of ammonium sulfate, ammonium thiocyanate, or ammonium nitrate to urea or 1% to 20% by weight of the binder weight, of simple salts such as ammonium chloride, ammonium sulfate, ammonium thiocyanate, ammonium nitrate, aluminum nitrate, etc.

The above cited compositions will react under temperatures ranging from 100° C. to 200° C. and pressures of 1 to 30 kg/cm$^2$ to produce particle board or plywood with formaldehyde post-emissions lower than those of the particle board and plywood of the prior art.

The formaldehyde emissions of particle board prepared using the binder of the invention are lower than 10 mg/100 g which is the specification of DIN E-1.

Actually the particle board of the invention presents formaldehyde post-emissions ranging from 2 to 6 mg/100 g which is a remarkable improvement over the state of art. The plywood of the invention shows formaldehyde emissions of 20-30 mg/m$^2$ by the modified Roffael method and thereby matches the emission range of phenolic resin bonded plywood.

The following Examples are intended to illustrate preferred embodiments of the invention and not to restrict the scope of the matter claimed herein. In the Examples all parts and percentages are parts or percentages by weight unless otherwise indicated.

EXAMPLE 1

A slurry of 15.6 parts of manioc starch (15% moisture) in 13.1 parts of water and 0.004 parts of Ca(OH)$_2$ is adjusted to pH of 6.8-7.2. Then 0.07 parts of bacterial alpha-amylase enzyme (Pfizer, 250 bacterial amylase units/g.) and 0.14 parts of amyloglucosidase (230 units/g) is added. The mixture is well-stirred and the temperature raised slowly (about 1° C./min) to 85° C. The temperature is maintained at 85° C. until the starch-iodide test is negative (at least about 30 minutes).

Then 1.15 parts of urea are added, the pH is adjusted to 4.5-4.8 with 5% H$_2$SO$_4$ and the mixture is refluxed for 30 minutes. The mixture is cooled to 60° C., 23.8 parts of 44% aqueous formaldehyde is added slowly. Then the pH is adjusted to 7.8-8.2 with Ca(OH)$_2$, 10.05 parts of urea are added and the mixture is refluxed for 30 minutes. The pH of the hot solution is adjusted to 4.8-5.2 with 5% H$_2$SO$_4$ and the heating is continued until the Gardner viscosity of the mixture is E-F. Then the pH is adjusted to 7.8-8.2 with Ca(OH)$_2$ before about 12% of the mixture is removed by distillation under vacuum. To the residual mixture is added 16.2 parts of 44% aqueous formaldehyde, 18.9 parts of urea and sufficient Ca(OH)$_2$ to adjust the pH to 7.8-8.2. The mixture is held at 70° C. for one hour and then cooled to room temperature. The product which is especially suitable as a plywood binder has a solids content of 66-68%, a free formaldehyde content of 0.05-0.07%, and a viscosity (25° C.) of about 350 cps.

EXAMPLE 2

To 5.13 parts of a 50% solids starch hydrolyzate prepared as in Example 1 is added 51.3 parts of 44% aqueous formaldehyde and sufficient 5% H$_2$SO$_4$ to give a pH of about 2.0. The mixture is heated to 90-95° C. before 17.7 parts of urea are added slowly with stirring to control the exotherm. When the reaction is complete, the pH is adjusted to 7.8-8.0 with 50% NaOH solution. The mixture is cooled to 50° C., 9.97 parts of urea are added, and the mixture is heated under vacuum to distill off about 15% by weight of the reactor charge. An additional 13.2 parts of urea are added slowly during about 30 minutes while maintaining the temperature at 60° C. Finally, 2.2 parts of NaCl are added at 60° C. and the mixture is homogenized and cooled to room temperature. The product which is particularly suitable as a binder for particle board has a solids content of about 72%, a free formaldehyde content of about 0.05% and a viscosity (25° C.) of about 700 cps.

EXAMPLE 3

The aqueous dispersion of starch in water of Example 1 is prepared to provide a solids:water ratio of 20:80 to 60:40, under a temperature of 0° to 35° C. Hydrogen peroxide is then added in a 0.01-0.5% ratio of solids content in the starch. After the pH is adjusted to 7.0 to 10.0 by addition of a NaOH and NaCl solution, 0.001-0.1% FeSO$_4$ solution is added. After 5 to 50 minutes of reaction, excess peroxide is neutralized with a sodium acid sulfite solution. The pH is once more adjusted to 6.8-7.2 and enzymatic hydrolysis is carried out as in Example 1. The resulting hydrolyzed concentrate is treated with urea and formaldehyde as was the hydrolyzate in Example 1.

EXAMPLE 4

The general procedure of Example 1 was carried out except that the starch hydrolyzate used was a commercial corn syrup obtained from Refinacoes de Milho Brasil. The syrup which had a solids content of 72% was diluted with water to give a 50% solids material before it was treated with urea and formaldehyde.

COMPARATIVE TEST RESIN

A conventional UF resin with a urea:formaldehyde molar ratio of 1:1.3 was prepared by reacting one-third of the total urea with formaldehyde at pH 2.5-4.0 at 85° C. and finally at reflux. The second third of the urea was heated with the mixture at pH 8.0 under reflux for 30 minutes followed by one hour at 95° C. Finally the last third of urea was added and the system was cooled, homogenized and allowed to stand for 24 hours.

The following procedure is used to make particle board using the resins of the examples. A glue is formed by mixing the resin with 1-5% of wax emulsion and 1-5% of ammonium chloride, both percentages based on the weight of the resin. Sufficient water is added to give a desired viscosity. Pinus wood particles soaked with 8-12% resin on a dry solids basis are pressed at 160° C. under a pressure of 26 kg/cm$^2$ for 4 minutes to form boards 11 mm × 35 cm × 35 cm. The physical properties are measured by the German DIN 52361 methods. The formaldehyde emission is measured by the Perforator method. In this method formaldehyde is extracted from samples of the particle board by boiling toluene; formaldehyde is then extracted from the toluene with water; and the formaldehyde content of the aqueous solution is determined iodometrically. The test results given in Table I show that particle board made using the binder composition of this invention has good strength and less formaldehyde emission than the particle board prepared using a conventional UF resin binder.

TABLE I

| RESIN OF EXAMPLE | HCHO EMISSION (mg/100 g) | TENSILE STRENGTH (kg/cm$^2$) | FLEXION (kg/cm$^2$) |
| --- | --- | --- | --- |
| 2 | 3-5 | 5.6 | 212-215 |
| 3 | 3-5 | 5.2-5.8 | 206-215 |
| Comparative test resin | 8-10 | 4.8 | 208 |

The following procedure is used to make plywood using resins of the examples. A glue is prepared using 100 parts of resin, 30 parts wheat flour, 3 parts ammonium chloride and sufficient water (about 30 parts) to give a desired viscosity. About 350 g. of the glue is applied per m$^2$ of contact surface area of the wood. The glued wood surfaces are then pressed at 115°-120° C. at a pressure of 6-8 kg/cm$^2$ for 1½ min for each mm of thickness plus 2 min holding time. Tensile strength and soak test are determined by the American Standard Method, CS-3561. Formaldehyde emission is determined using a modified Roffael method (CHR brochure 78-4, Houtinstituut TNO, Delft, August, 1978) after the sides of the test pieces are sealed with wax. The results given in Table II show that plywood made using the binder composition of this invention has good strength and much less formaldehyde emission than plywood prepared using a conventional UF resin binder.

TABLE II

| RESIN OF EXAMPLE | HCHO EMISSION (mg/m$^2$) | TENSILE STENGTH (kg/cm$^2$) | SOAK TEST (ave cycles) |
|---|---|---|---|
| 1 | 15–25 | 19–25 | 11 |
| 3 | 20–30 | 20–27 | 13 |
| 4 | 20–30 | 20–25 | 11 |
| Comparative test resin | 70–90 | 20–28 | 12 |

What is claimed is:

1. A binder for use in production of particle board and plywood with low formaldehyde emission which consists essentially of a polymer formed by the reaction of an acidified starch hydrolyzate, urea and formaldehyde, wherein the starch hydrolyzate comprises from about 3% to about 40% by weight of the polymer on a dry solids basis and wherein the molar ratio of urea to formaldehyde in the polymer is from about 1:1 to about 1:1.5.

2. The binder of claim 1, wherein the starch hydrolyzate comprises between about 4% and about 25% by weight of the polymer.

3. A process for the preparation of a binder of claim 1 which comprises
   adjusting the pH of an aqueous solution of starch hydrolyzate and formaldehyde to from about 0.5 to about 3.0, said aqueous solution containing from about 40% to about 80% by weight of water and having a weight ratio of starch hydrolyzate to formaldehyde of from about 1:1 to about 1:10;
   slowly adding urea to said solution of starch hydrolyzate and formaldehyde while maintaining the temperature below about 95° C. until the molar ratio of urea to formaldehyde is from about 1:4 to about 1:2.5; then
   adjusting the pH of the mixture to from about 6.0 to about 8.5; and
   slowly adding more urea to the mixture while maintaining the temperature of the mixture in the range of from about 50° C. to about 70° C. until the molar ratio of urea to formaldehyde added to the mixture is from about 1:1 to about 1:1.5.

4. The process of claim 3, wherein the aqueous solution of starch hydrolyzate is prepared by adding a mixture of alpha-amylase and amyloglucosidase enzymes to a stirred slurry of starch at a pH from about 4 to about 8; slowly raising the temperature of the slurry to from about 80° C. to about 90° C.; and holding the temperature of the slurry at this temperature until the starch is solubilized and the mixture gives a negative starch-iodide test.

5. The process of claim 4, wherein the starch is selected from the group consisting of wheat flour, maize flour, rice starch, corn starch, potato starch, manioc starch, tapioca, and oxidized starch.

6. The process of claim 3, wherein the solution of starch hydrolyzate is prepared by treating a stirred slurry of starch at a pH from about 4 to about 8 first with an alpha-amylase enzyme at a temperature of from about 30° C. to about 60° C. and then with an amyloglucosidase enzyme at a temperature from about 60° C. to about 90° C. until the starch is solubilized and the mixture gives a negative starch-iodide test.

7. A process for preparation of a binder of claim 1 which comprises refluxing an aqueous solution of the starch hydrolyzate containing from about 40% to about 80% by weight of water and from about 2% to about 5% of the total amount of urea at a pH of from about 3 to about 5 for from about 20 to about 60 minutes; adding to the solution from about 50% to about 60% of the total amount of formaldehyde; adjusting the pH to from about 6.0 to about 8.5; adding from about 20% to about 40% of the urea, and again refluxing the mixture; adjusting the pH of the mixture to from between about 4.0 and about 5.5, and refluxing until the Gardner viscosity of the solution is E to F; adjusting the pH to from about 6.0 to about 8.5, adding the final portions of formaldehyde and urea, and maintaining the temperature of the mixture at from about 60° C. to about 80° C. for from 30 to 90 minutes.

8. A process for bonding lignocellulosic material under heat and pressure, where the bonded lignocellulosic material is characterized by a low emission of formaldehyde, which comprises applying the binder of claim 1 and from about 1% to about 20% by weight of the binder of a curing agent to said lignocellulosic material, and consolidating said lignocellulosic material at a temperature from about 100° C. to about 200° C. and a pressure from about 1 to about 30 kg/cm$^2$.

9. The process of claim 8 wherein the curing agent is selected from the group consisting of: ammonium chloride, ammonium sulfate, ammonium thiocyanate, ammonium nitrate and aluminum nitrate.

10. The process of claim 9 wherein the curing agent further comprises urea.

11. Particle board prepared by the process of claim 8 wherein the binder comprises from about 5% to about 15% by weight of the lignocellulosic material.

12. Plywood prepared by the process of claim 8 wherein the binder is applied at a rate of from about 200 to about 400 grams of binder per square meter of contact surface area.

* * * * *